(12) United States Patent
Azar et al.

(10) Patent No.: US 12,696,946 B2
(45) Date of Patent: Aug. 4, 2026

(54) METHOD AND SYSTEM FOR PROVIDING ALERTS TO A USER

(71) Applicant: GoPro, Inc., San Mateo, CA (US)

(72) Inventors: Joseph Azar, Five Dock (AU); Thomas Larcher, Mosman (AU); Sebastian Bernard Alexander Adams, Sydney (AU)

(73) Assignee: GoPro, Inc., San Mateo, CA (US)

( * ) Notice: Subject to any disclaimer, the term of this patent is extended or adjusted under 35 U.S.C. 154(b) by 35 days.

(21) Appl. No.: 18/820,435

(22) Filed: Aug. 30, 2024

(65) Prior Publication Data

US 2024/0415222 A1 Dec. 19, 2024

Related U.S. Application Data

(63) Continuation of application No. PCT/AU2023/050142, filed on Mar. 2, 2023.

(30) Foreign Application Priority Data

Mar. 3, 2022 (AU) ................................ 2022900502

(51) Int. Cl.
*A42B 3/04* (2006.01)
*G01C 21/36* (2006.01)
(52) U.S. Cl.
CPC .......... *A42B 3/046* (2013.01); *G01C 21/3691* (2013.01)
(58) Field of Classification Search
CPC ............................ A42B 3/046; G01C 21/3691
USPC ........................................................ 701/423
See application file for complete search history.

(56) References Cited

U.S. PATENT DOCUMENTS

| | | | | |
|---|---|---|---|---|
| 6,973,384 B2 * | 12/2005 | Zhao | ....................... | H04W 4/02 |
| | | | | 342/357.29 |
| 7,057,532 B2 * | 6/2006 | Shafir | ................ | G01C 21/3697 |
| | | | | 340/995.13 |
| 7,880,642 B2 * | 2/2011 | Gueziec | ............... | G08G 1/0125 |
| | | | | 340/905 |
| 8,417,442 B2 * | 4/2013 | Johnson | .............. | G06F 16/9535 |
| | | | | 370/335 |
| 9,002,636 B2 * | 4/2015 | Udeshi | ............... | G01C 21/3691 |
| | | | | 701/521 |
| 2002/0121989 A1 * | 9/2002 | Burns | .............. | G08G 1/096827 |
| | | | | 340/901 |

(Continued)

FOREIGN PATENT DOCUMENTS

| | | |
|---|---|---|
| CN | 109035774 A | 12/2018 |
| WO | 2020210879 A1 | 10/2020 |

OTHER PUBLICATIONS

International Preliminary Report on Patentability issued in App. No. PCT/AU2023/050142, dated Jun. 5, 2024, 36 pages.

*Primary Examiner* — Luis A Martinez Borrero
(74) *Attorney, Agent, or Firm* — Young Basile Hanlon & MacFarlane, P.C.

(57) ABSTRACT

The present disclosure relates to methods and systems for providing alerts to a helmet user. A method includes determining a current location of the user, determining a transit area and a transit direction of the user based on the current location, retrieving records of transit alerts based on the transit area of the user, selecting relevant transit alerts from the records of transit alerts based on the transit direction of the user, and alerting the user of the relevant transit alerts.

20 Claims, 7 Drawing Sheets

(56) References Cited

U.S. PATENT DOCUMENTS

| 2007/0299601 | A1* | 12/2007 | Zhao | G08G 1/096775 |
| | | | | 701/516 |
| 2012/0283942 | A1* | 11/2012 | T'Siobbel | G01C 21/26 |
| | | | | 701/410 |
| 2013/0311075 | A1 | 11/2013 | Tran | |
| 2013/0345953 | A1* | 12/2013 | Udeshi | G01C 21/3691 |
| | | | | 701/465 |
| 2014/0207369 | A1* | 7/2014 | Yuasa | G08G 1/096827 |
| | | | | 701/533 |
| 2015/0087264 | A1* | 3/2015 | Goyal | H04W 4/027 |
| | | | | 455/411 |
| 2015/0160023 | A1* | 6/2015 | Goel | G08G 1/0129 |
| | | | | 701/400 |
| 2019/0220678 | A1* | 7/2019 | Guo | G06T 7/73 |
| 2021/0312842 | A1 | 10/2021 | Tashima | |
| 2022/0031006 | A1* | 2/2022 | Boyadgis | A42B 3/30 |
| 2022/0047028 | A1* | 2/2022 | Venkata Jagannadha Rao | A42B 3/046 |

* cited by examiner

METHOD AND SYSTEM FOR PROVIDING ALERTS TO A USER

CROSS-REFERENCE TO RELATED APPLICATION(S)

This application is a bypass continuation of international patent application PCT/AU2023/050142, filed Mar. 2, 2023, which claims priority to Australian Provisional Patent Application No. 2022900502, filed Mar. 3, 2022, both of which are herein incorporated by reference. The Applicant's international patent application PCT/AU2020/050386, entitled "A VISUAL COMMUNICATION SYSTEM FOR A HELMET," published as WO2020/210879 with an international filing date of 20 Apr. 2020, is also herein incorporated by reference in its entirety.

TECHNICAL FIELD

The present disclosure relates to a method and system for providing alerts to a user. Preferred embodiments in the disclosure relate to methods and systems for providing transit alerts to a user.

BACKGROUND

Navigation and mapping systems are commonly used by individuals to obtain navigational routes to desired destinations. Consumer navigation and mapping applications used typically require an initial input of the desired destination and provide a pre-planned route from the user's current location to the desired destination. Optionally, the application may provide details of road alerts along the pre-planned route, such as traffic lights, speed cameras, police cars, etc. These alerts are typically displayed visually on a map along the pre-planned route.

However, such systems have an inherent limitation in a lack of flexibility of the user to adapt to new or changing traffic conditions or alerts. For example, a traffic accident on a road adjacent to the pre-planned route may cause traffic to increase along the pre-planned route, but this would not be considered by the previous applications until the traffic situation had extended to the pre-planned route. Moreover, such applications do not provide for the user to spontaneously traverse areas while avoiding road alerts in a "free roam" or "free navigation" modes.

Any reference to or discussion of any document, act, or item of knowledge in this specification is included solely for the purpose of providing a context for the present invention. It is not suggested or represented that any of these matters or any combination thereof formed at the priority date part of the common general knowledge or was known to be relevant to an attempt to solve any problem with which this specification is concerned.

SUMMARY

In a first aspect, the present disclosure provides a method for providing alerts to a user, the method comprising: determining a current location of the user, determining a transit area and a transit direction of the user from the current location, retrieving records of transit alerts in the transit area of the user, selecting relevant transit alerts from the records of transit alerts, and alerting the user of the relevant transit alerts.

In certain embodiments, the transit direction defines a direction of travel along a road by the user.

In certain embodiments, the transit direction is determined from a bearing of the user.

In other embodiments, the transit direction is determined from a comparison of the current location and previously stored location(s). In certain embodiments, the previously stored location(s) are deleted after determining the transit direction.

In an embodiment, the method further comprises determining a projected transit path of the user from the transit area and the transit direction, wherein the relevant transit alerts are selected from the records of transit alerts by removing transit alerts that are not on the projected transit path.

In an embodiment, the projected transit path is limited within the transit area.

In an embodiment, the projected transit path includes traffic routes from the current location in the transit direction, and traffic routes from the current location including one or two or more turns from the transit direction.

The term 'turn' is intended to define a new routing leg or course from the current leg (at the current location and in the transit direction) of the user. For example, 'one turn' may include a left turn, a right turn, or a U-turn at any point on the current leg, and 'two turns' may include any turn at any point on the current leg followed by a further turn on the next leg.

In certain embodiments, the projected transit path includes traffic routes from the current location in the transit direction, and traffic routes from the current location including one turn from the transit direction.

In certain embodiments, the projected transit path includes traffic routes from the current location in the transit direction, and traffic routes from the current location including one or two turns from the transit direction.

In certain embodiments, the projected transit path includes traffic routes from the current location in the transit direction, and traffic routes from the current location including one, two or three turns from the transit direction.

In certain embodiments, the projected transit path includes traffic routes from the current location in the transit direction, and traffic routes from the current location including one, two, three or four turns from the transit direction.

In an embodiment, the projected transit path includes traffic routes from the current location up to four turns from the transit direction.

In certain embodiments, the projected transit path includes traffic routes from the current location up to three turns from the transit direction.

In certain embodiments, the projected transit path includes traffic routes from the current location up to two turns from the transit direction.

In an embodiment, the projected transit path excludes traffic routes from the current location in a 90-degree arc opposite the transit direction.

In an embodiment, the projected transit path excludes traffic routes from the current location in a 180-degree arc opposite the transit direction.

In certain embodiments, the projected transit path excludes traffic routes from the current location in an arc of about 10, 20, 30, 40, 50, 60, 70, 80, 90, 100, 110, 120, 130, 140, 150, 160, 170, 180, 190, 200, 210, 220, 230, 240, 250, 260, or 270 degrees opposite the transit direction.

In an embodiment, the project transit path excludes traffic routes from the current location in an arc opposite the transit direction, where the arc angle is variable depending on a transit speed of the user. In certain embodiments, the arc angle increases as the transit speed of the user increases. For example, the arc angle may be smaller at low transit speeds, and the arc angle may be larger at high transit speeds.

In certain embodiments, the projected transit path excludes traffic routes in an arc opposite the transit direction depending on the number of relevant transit alerts. For example, if more than a predetermined number of relevant transit alerts are found in the transit area, the projected transit path may exclude traffic routes in a large arc opposite the transit direction. However, if less than the predetermined number of relevant transit alerts are found in the transit area, the projected transit path may include all traffic routes in the transit area.

In an embodiment, each transit alert is analysed for traffic routes that would lead to the transit alert, and the relevant transit alerts are selected from the records of transit alerts by comparing overlapping regions of the transit area and/or transit direction of the user with the traffic routes that would lead to the transit alerts.

In certain embodiments, the traffic routes are bound by a radius around a location of the transit alert. In further embodiments, the radius is selected from about 10 m, 20 m, 30 m, 40 m, 50 m, 100 m, 150 m, 200 m, 250 m, 300 m, 350 m, 400 m, 450 m, 500 m, 550 m, 600 m, 650 m 700 m, 750 m, 800 m, 850 m, 900 m, 950 m, or 1000 m.

In other embodiments, the radius is variable depending on a transit speed of the user. In certain embodiments, the radius increases as the transit speed of the user increases. For example, the radius may be smaller at low transit speeds, and the radius may be larger at high transit speeds.

In certain embodiments, the traffic routes include one turn from the transit direction.

In certain embodiments, the traffic routes include one or two turns from the transit direction.

In certain embodiments, the traffic routes include one, two or three turns from the transit direction.

In certain embodiments, the traffic routes include one, two, three or four turns from the transit direction.

In a second aspect, the present disclosure provides a method for providing alerts to a user, the method comprising: determining a current location of the user, determining a transit area from the current location, retrieving records of transit alerts in the transit area of the user, and alerting the user of the relevant transit alerts.

In an embodiment, the relevant transit alerts are selected from the records of transit alerts by removing transit alerts that are not in the transit area.

In an embodiment, each transit alert is analysed for a transit alert area, and the relevant transit alerts are selected from the records of transit alerts by comparing overlapping regions of the current location and the transit alert areas.

In certain embodiments, the transit area has a similar area as the transit alert areas.

In certain embodiments, the transit area has a greater area than the transit alert areas.

In an embodiment, the relevant transit alerts are sorted by a priority according to their distance from the current location and the number of turns from the transit direction.

In an embodiment, the user is alerted to the relevant transit alerts in order of their priority.

In certain embodiments, the user is only alerted to a predetermined number of relevant transit alerts having the highest priority. In certain embodiments, the predetermined number is selected from 1, 2, 3, 4, 5, 6, 7, 8, 9, or 10 alerts.

In other embodiments, the user is only alerted to a predetermined number of relevant transit alerts having the highest priority, where the predetermined number of relevant transit alerts is variable depending on a transit speed of the user or a transit direction of the user. In certain embodiments, the predetermined number of relevant transit alerts increases as the transit speed of the user increases. For example, the predetermined number of relevant transit alerts may be smaller at low transit speeds, and the predetermined number of relevant transit alerts may be larger at high transit speeds.

In an embodiment, the transit alerts include speed camera alerts, police alerts, ambulance alerts, fire brigade alerts, traffic hazard alerts, traffic accident alerts, and/or other traffic closure or delay alerts. In some embodiments, the traffic closure or delay alerts may include alerts for oil slicks, downed trees, flood warnings, or traffic congestion.

In an embodiment, alerting the user of relevant transit alerts in the projected transit path includes alerting the user visually.

In certain embodiments, the user is alerted visually via a display, optionally a navigational display.

In an embodiment, alerting the user of relevant transit alerts in the projected transit path includes alerting the user audibly.

In certain embodiments, the user is alerted audibly via a speaker. Optionally, the speaker may read the relevant transit alerts, for example via a text-to-speech application. In certain embodiments, the text-to-speech application may be an external application.

In certain embodiments, the user is alerted visually and audibly.

In an embodiment, the transit area is defined by a radius around the current location.

In certain embodiments, the radius is selected from about 10 m, 20 m, 30 m, 40 m, 50 m, 100 m, 150 m, 200 m, 250 m, 300 m, 350 m, 400 m, 450 m, 500 m, 550 m, 600 m, 650 m 700 m, 750 m, 800 m, 850 m, 900 m, 950 m, or 1000 m.

In an embodiment, the radius is variable depending on a transit speed of the user. In certain embodiments, the radius increases as the transit speed of the user increases. For example, the radius may be smaller at low transit speeds, and the radius may be larger at high transit speeds.

In an embodiment, the transit area is defined by a circular sector with a center at the current location.

In certain embodiments, the circular sector has a radius selected from about 10 m, 20 m, 30 m, 40 m, 50 m, 100 m, 150 m, 200 m, 250 m, 300 m, 350 m, 400 m, 450 m, 500 m, 550 m, 600 m, 650 m 700 m, 750 m, 800 m, 850 m, 900 m, 950 m, or 1000 m.

In an embodiment, the circular sector has a radius that is variable depending on a transit speed of the user. In certain embodiments, the radius increases as the transit speed of the user increases. For example, the radius may be smaller at low transit speeds, and the radius may be larger at high transit speeds.

In an embodiment, the transit area is defined by a traffic route distance from the current location.

In certain embodiments, the traffic route distance selected from about 10 m, 20 m, 30 m, 40 m, 50 m, 100 m, 150 m, 200 m, 250 m, 300 m, 350 m, 400 m, 450 m, 500 m, 550 m, 600 m, 650 m 700 m, 750 m, 800 m, 850 m, 900 m, 950 m, or 1000 m.

In an embodiment, the traffic route distance is variable depending on a transit speed of the user. In certain embodiments, the traffic route distance increases as the transit speed of the user increases. For example, the traffic route distance may be smaller at low transit speeds, and the radius may be larger at high transit speeds.

In certain embodiments, the traffic route distance includes one or more turns from the transit direction.

In certain embodiments, the traffic route distance includes one turn from the transit direction.

In certain embodiments, the traffic route distance includes one or two turns from the transit direction.

In certain embodiments, the traffic route distance includes one, two or three turns from the transit direction.

In certain embodiments, the traffic route distance includes one, two, three or four turns from the transit direction.

In an embodiment, the current location of the user is provided by a satellite positioning system, a Wi-Fi positioning system (WPS), or a combination thereof.

In certain embodiments, the satellite positioning system is selected from a GPS system, a GLONASS system, a BeiDou system, or a Gallelio system.

In an embodiment, the method is a computer-implemented method.

In a third aspect, the present disclosure provides a system for providing an alert to a user, comprising: a navigation unit configured to provide current location information of the user, a memory unit configured to store previous location information from the navigation unit, a processing module configured to determine a transit area and a transit direction of the user from the current location and previously stored location(s), retrieve records of transit alerts in the transit area of the user, and select relevant transit alerts from the records of transit alerts, and a communication means configured to alert the user of the relevant transit alerts.

In an embodiment, the processing module includes a data communication unit for retrieving records of transit alerts from an external source.

In certain embodiments, the data communication unit connects to a cellular data network.

In certain embodiments, the data communication unit includes a Bluetooth unit or a Wi-Fi unit for connecting to a cellular data enabled device.

In an embodiment, the communication means includes a display for visually alerting the user of the relevant transit alerts.

In an embodiment, the communication means includes an array of light emitting devices for visually alerting the user.

In an embodiment, the communication means includes a speaker for audibly alerting the user of the relevant transit alerts.

In an embodiment, the system is configured to continuously update the relevant transit alerts and alert the user as movement is detected by the navigation unit.

In an embodiment, the navigation unit is a satellite positioning unit, a Wi-Fi positioning system (WPS), or includes a combination thereof.

In certain embodiments, the satellite positioning unit is selected from a GPS unit, a GLONASS unit, a BeiDou unit, or a Gallelio unit.

In an embodiment, the system is configured to conduct the method according the first or second aspects.

In a fourth aspect, the present disclosure provides a helmet comprising: an impact resistant shell; a crash protection assembly including energy absorbing elements; and a system for providing an alert to a user in accordance with the first or the second aspect.

In an embodiment, the helmet further comprises an array of light emitting devices arranged inside the helmet for visually alerting the user of the relevant transit alerts.

In an embodiment, the array of light emitting devices generate a light signal directed toward a peripheral vision area of the helmet.

In an embodiment, the array of light emitting devices comprise a plurality of light-emitting diodes (LED) devices.

In an embodiment, the LED devices are arranged to emit light with different colors and/or emit specific light patterns, each color and/or light pattern being associated with a different transit alert or a location of the transit alert.

In an embodiment, the helmet further comprises a speaker for audibly alerting the user of the relevant transit alerts.

In an embodiment, the helmet further comprises a crash resistant battery.

In an embodiment, each component of the system is in an internal section of the helmet.

In certain embodiments, each component of the system is waterproofed.

Further features and advantages of the present disclosure will become apparent from the following detailed description.

BRIEF DESCRIPTION OF THE DRAWINGS

Various preferred embodiments of the present disclosure will now be described, by way of examples only, with reference to the accompanying figures, in which:

FIG. 7a illustrates a perspective view of motorcycle helmet including a system for providing an alert to a user according to a seventh embodiment of the invention; and FIG. 7b illustrates a side view of motorcycle helmet of FIG. 7a.

DETAILED DESCRIPTION

The invention relates to methods and systems for providing alerts to a user. The Figures illustrate various embodiments for providing these alerts, as represented on a map interface.

Figure 1:
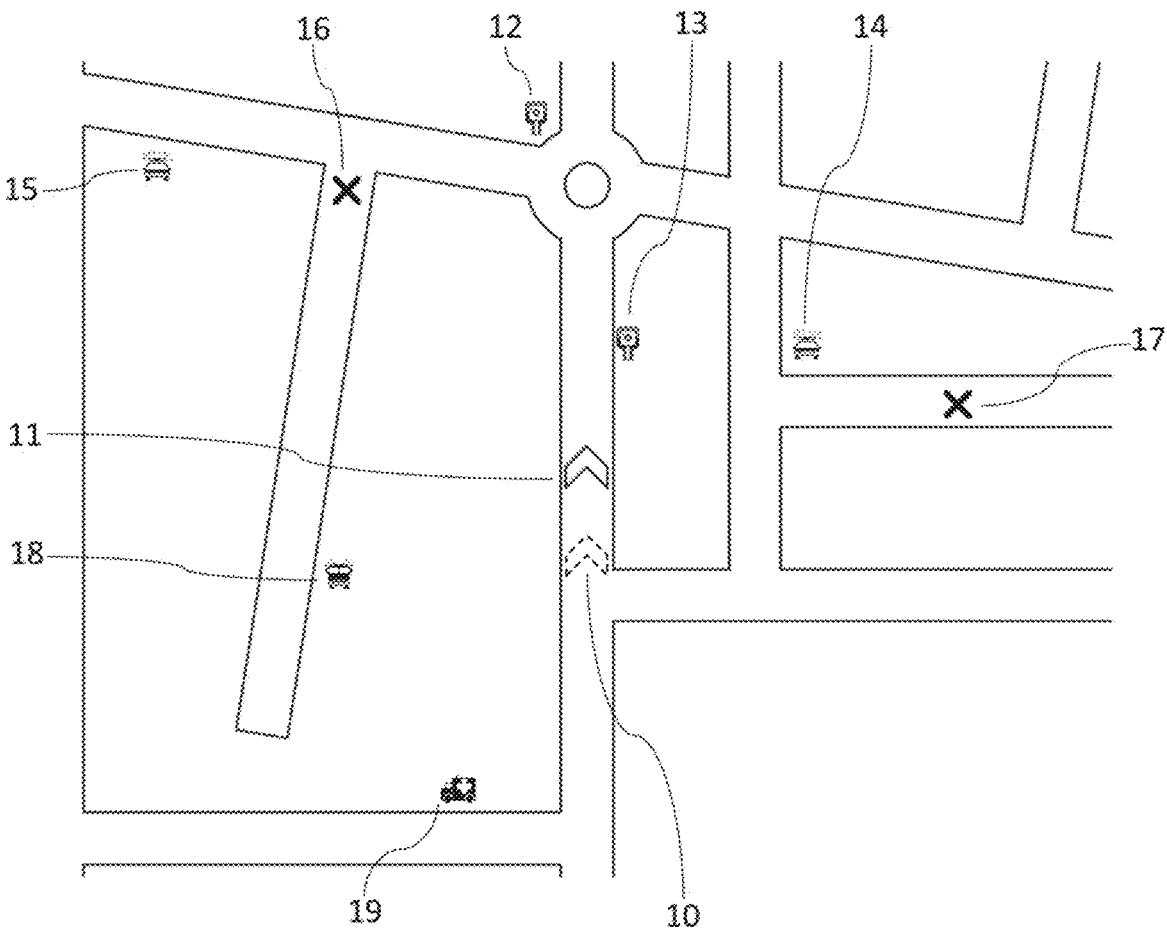
FIG. 1 illustrates an example map displaying a transit direction according to embodiments of the invention.

As shown in FIG. 1, a transit direction of a user may be determined by assessing a current location 11 and comparing this location to a previously stored location 10. These locations may be taken by any conventional method such as with a satellite positioning system (including GPS, GLONASS, BeiDou, or Gallelio systems), a Wi-Fi positioning system (WPS), or a combination thereof. For simplicity, the following examples refer to locations from a GPS device, such that current location 11 is a current GPS location 11, and the previously stored location 10 is a previously stored GPS location 10. From these two data points, the transit direction of the user may be determined to be travelling upward toward the roundabout—this has been represented by the chevron for the current GPS location 11.

In alternative embodiments, the transit direction may be determined from the current location 11 and a bearing of the user collected with the location data. In some implementations, this may be preferred due to privacy concerns with temporarily recording two or more user locations to determine a transit direction.

Figure 2:
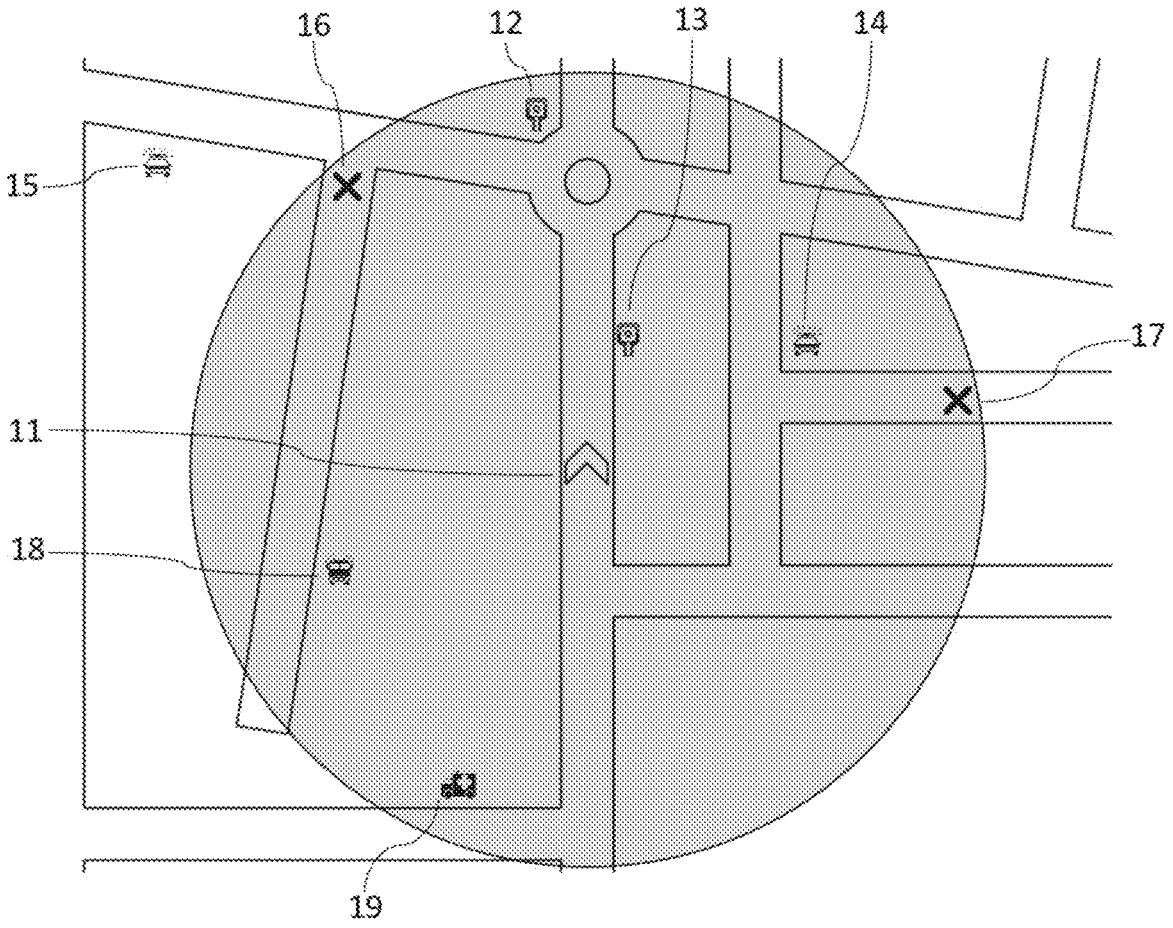
FIG. 2 illustrates the map of FIG. 1, further displaying a transit area according to a first embodiment of the invention.
Figure 3:
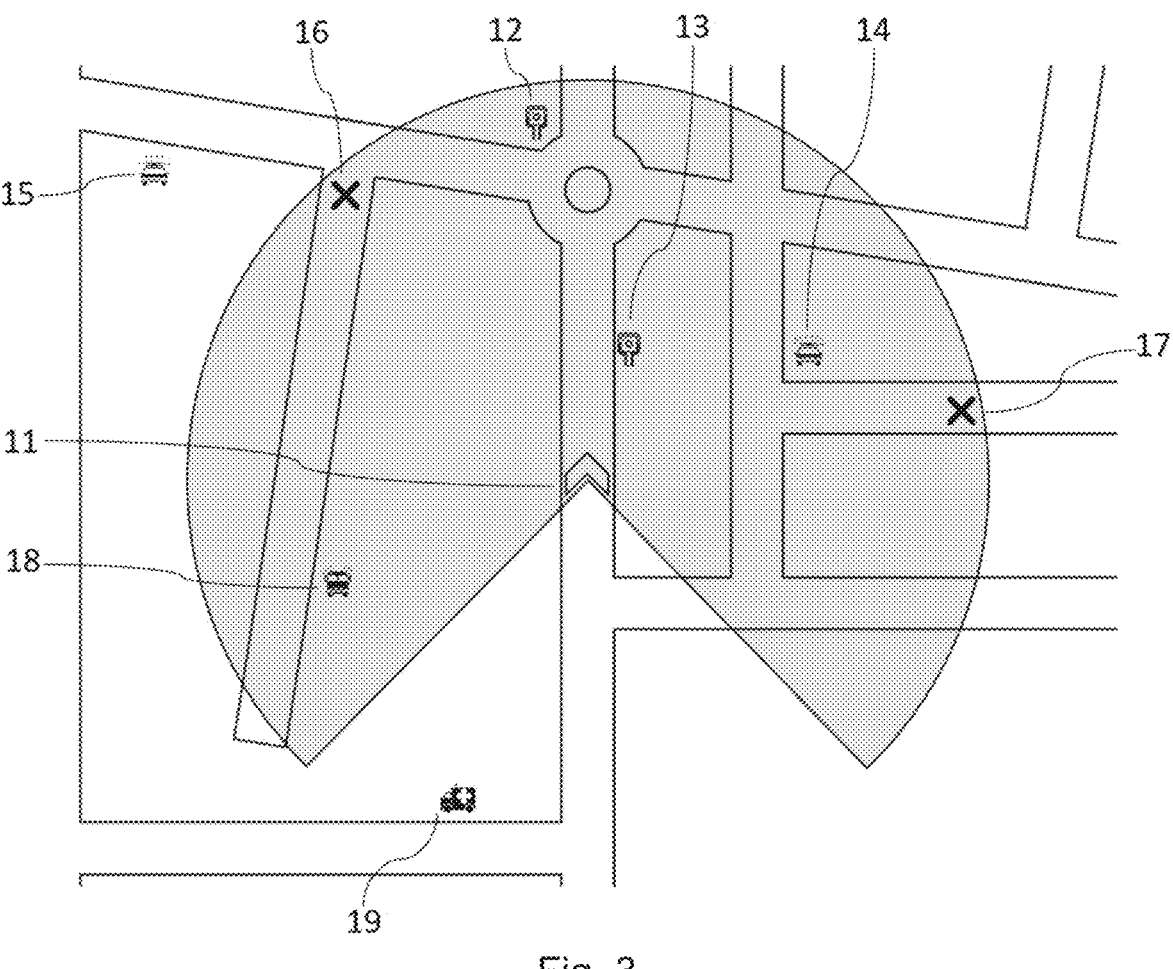
FIG. 3 illustrates the map of FIG. 1, further displaying a transit area according to a second embodiment of the invention.
Figure 4:
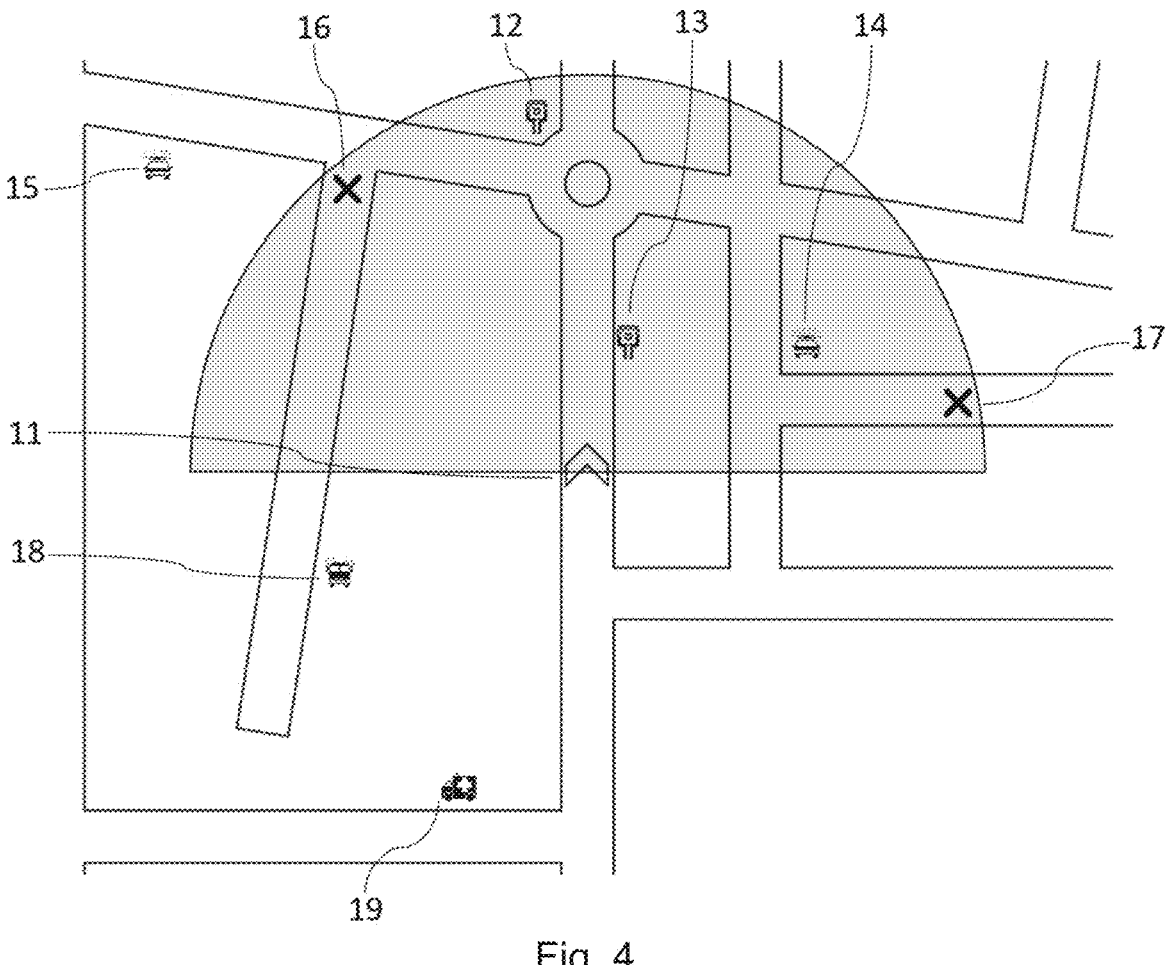
FIG. 4 illustrates the map of FIG. 1, further displaying a transit area according to a third embodiment of the invention.

A transit area, represented by the shaded area in FIGS. 2-4, may also be determined from the current GPS location 11 as a radius (FIG. 2), or a circular sector (FIGS. 3 and 4) centered at the current GPS location 11. In further embodiments, the transit area may be defined by a traffic route distance from the current GPS location 11, e.g. any road that the user may reach after travelling a predetermined distance.

In some embodiments, the radius, circular sector radius, or traffic route distance defining the transit area may be variable depending on a current transit speed of the user. For example, the radius, circular sector radius, or traffic route distance may be smaller at low transit speeds, or larger at high transit speeds, such as to adapt to the user's requirements and only provide the immediate relevant alerts—i.e. at higher speeds, the relevant distance for determining the relevant alerts increases as the user will reach those alerts in a reduced amount of time.

Once the current GPS location 11, transit direction, and transit area is known, the system retrieves all records of transit alerts in transit area of the user. These alerts have been represented by speed camera alerts 12, 13, police alerts 14, 15, traffic hazard alerts 16, 17, fire brigade alert 18 and ambulance alert 19. The full list of records is then reduced according a series of criteria discussed in the below embodiments and the user is alerted to the relevant transit alerts.

FIRST EMBODIMENT—CIRCULAR TRANSIT AREA

In the first embodiment, as illustrated in FIG. 2, the transit area is a circle with a center at the current GPS location 11. Accordingly, each of speed camera alerts 12, 13, police alert 14, traffic hazard alerts 16, 17, fire brigade alert 18 and ambulance alert 19 would be determined as relevant transit alerts such that the user would be alerted to each of these events. This alert may be provided visually, e.g. via a display such as on a mobile phone application, or audibly, e.g. verbally on a speaker system or via a headset, or both visually and audibly.

SECOND EMBODIMENT—CIRCULAR SECTOR TRANSIT AREA

Further to the first embodiment, the second embodiment as shown in FIG. 3 limits the transit area to exclude traffic routes in a 90-degree arc opposite the transit direction. This area has been excluded as it is uncommon for a commuter to require traffic alerts for events behind them and would further exclude the ambulance alert 19 from being provided to the user.

THIRD EMBODIMENT—REDUCED CIRCULAR SECTOR TRANSIT AREA

Further to the second embodiment, the third embodiment as shown in FIG. 4 even further limits the transit area to exclude traffic routes in a 180-degree arc opposite the transit direction. This area may be excluded for similar reasons as the second embodiment, or in circumstances where there are too many relevant alerts such that the relevant alerts should be reduced to prevent an information overload of alerts to the user. In this embodiment, the fire brigade alert 18 has been excluded from the relevant alerts.

In further embodiments, the excluded angle may be dependent on a parameter of the user, such as the transit speed of the user, to better adapt to the user's requirements and only provide the immediate relevant alerts. For example, if the user were travelling at a speed significantly less than the speed limit, the arc excluded angle may be 90 degrees (as in FIG. 3) such that the user may consider alternative routes with less transit alerts to expedite their journey; however, if the user were travelling at or approaching the speed limit, the arc excluded angle may be 180 degrees (as in FIG. 4) as they are advancing steadily and do not require alerts on adjacent routes.

FOURTH EMBODIMENT—PROJECTED TRANSIT PATH

In determining the relevant transit alerts, the system may further determine a projected transit path of the user from the transit area and the transit direction and exclude the transit alerts that are not on the projected transit path. The projected transit path includes all traffic routes in the transit direction and any routes within one or two turns from the transit direction. This embodiment may be combined with any of the previously discussed embodiments.

For example, referring to FIG. 4 and assuming left-hand traffic, speed camera alert 12 is in the transit direction, speed camera alert 13 is within one turn from the transit direction (i.e. U-turn at roundabout), and traffic hazard alert 16 and police alert 14 are within two turns from the transit direction (i.e. for traffic hazard alert 16: left at roundabout, next left turn). Traffic hazard alert 17 requires three turns from the transit direction, and accordingly would be excluded from the relevant transit alerts.

In certain embodiments, the relevant transit alerts may be sorted by a priority according to their distance from the current GPS location and/or the number of turns from the transit direction and/or the direction of the alerts. This priority may be used to provide the user with relevant alerts that they have a higher probability of encountering during their journey. In the above example, the speed camera alert 12 would be given the highest priority as it is directly along the transit direction, and accordingly the user would be alerted to this first.

In some embodiments, the priority can be weighted on various other factors. For example, the police alert 14 may be prioritised over traffic hazard alert 16 despite requiring the same number of turns if police alerts are considered more important to the user. In further embodiments, only a certain number of relevant transit alerts having the highest priority will be provided to the user to reduce information overload.

FIFTH EMBODIMENT—TRANSIT ALERT TRAFFIC ROUTES

In an alternative embodiment, each transit alert may be analysed for traffic routes that would lead to the transit alert, and the relevant transit alerts are selected from the records of transit alerts by comparing overlapping regions of the transit area and/or transit direction of the user with the traffic routes that would lead to the transit alerts.

Figure 5:
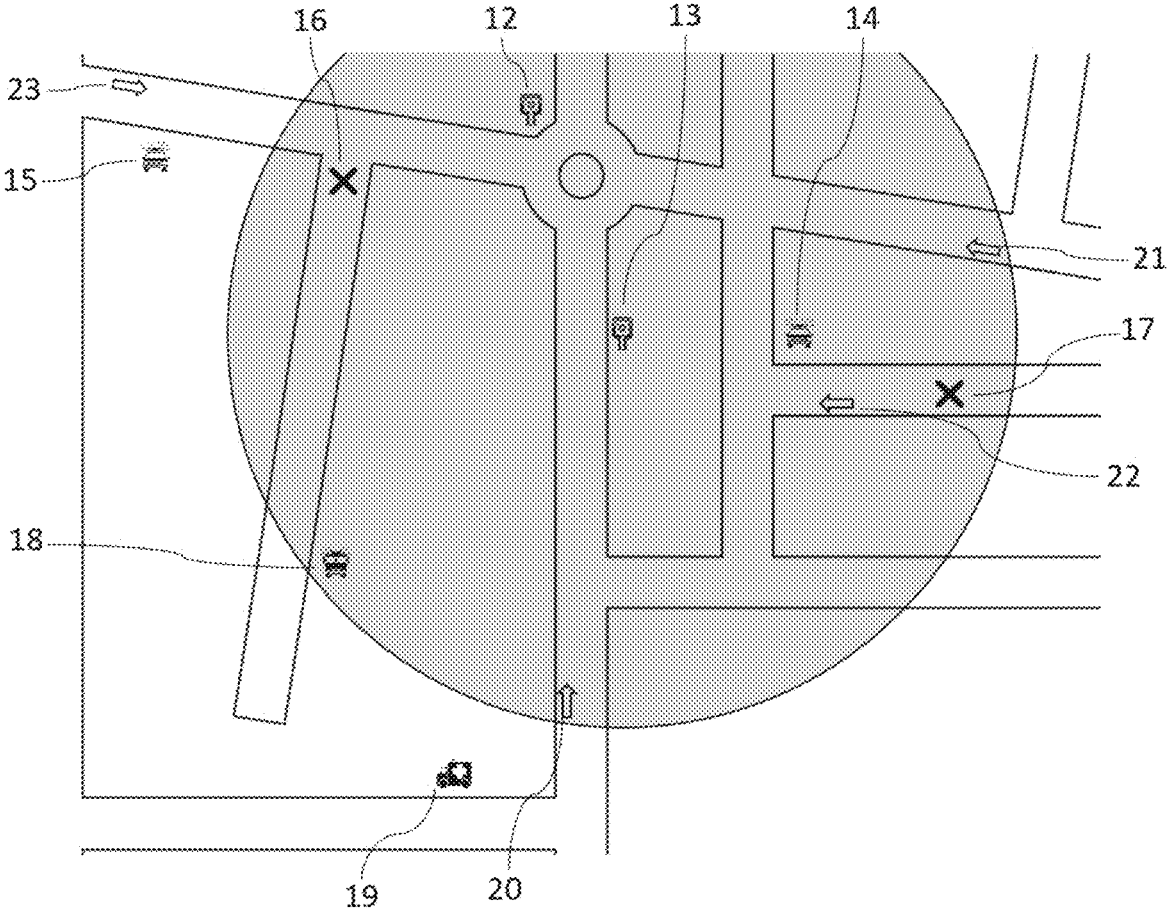
FIG. 5 illustrates an example map displaying an alternative transit area according to a fifth embodiment of the invention.

For example, as shown in FIG. 5, speed camera alert 13 has been analysed and a transit area around it has been established. As various users travel within the transit area and the relevant criteria is fulfilled (e.g. number of turns to speed camera 13), the users will be alerted of speed camera alert 13. In this example, users 20 and 21 are entering the transit area and are within one turn of speed camera alert 13, so they will be alerted of it. However, user 22 requires three turns and would not be alerted. Moreover, user 23 is not yet within the trans area, and would not be alerted.

This process may be repeated for each individual alert such that the users 20, 21, 22, 23 are individually alerted to the relevant alerts as they travel and enter the respective transit areas of the alerts 12-19. It is believed that, while this may increase the required load on the system infrastructure to individually analyse each alert, the resultant system may be more user friendly and update the user more consistently as they enter new alert transit areas.

SIXTH EMBODIMENT—TRANSIT ALERT AREAS

In a further alternative embodiment, each transit alert may be analysed for a transit alert area, and the relevant transit alerts are selected from the records of transit alerts by comparing overlapping regions of the current GPS location and the transit alert areas.

In this embodiment the relevant transit alerts are dependent only on the relative position of the current GPS location and the transit alert area. This embodiment differs from the Fifth Embodiment in that it does not consider the transit direction of the user. This may be useful in certain situations, for example, where the user has low connectivity or limited bandwidth, such that a minimal amount of information is required to determine the relevant transit alerts.

Figure 6:
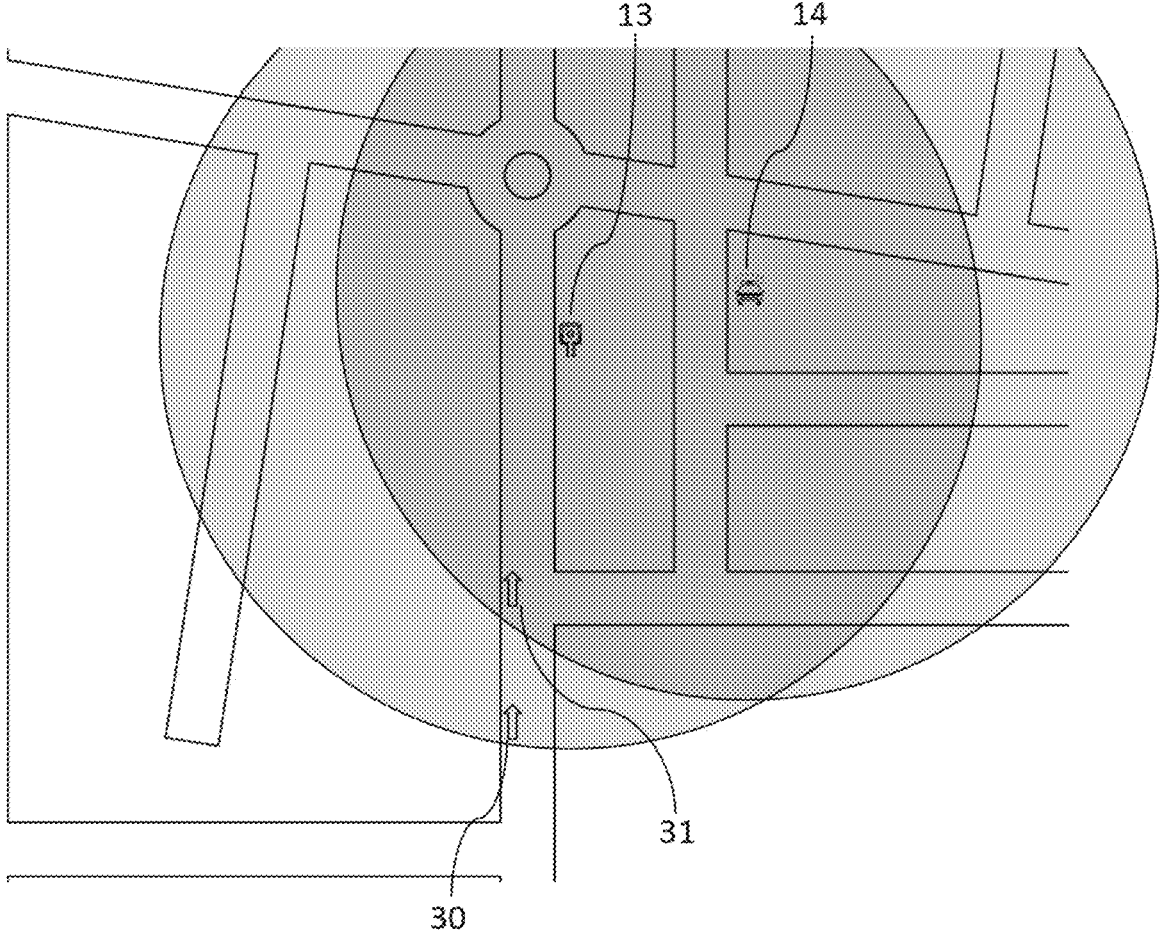
FIG. 6 illustrates an example map displaying a further alternative transit area system according to a sixth embodiment of the invention.

This embodiment is shown in FIG. 6 where speed camera alerts 13 and police alert 14 have been analysed and transit alert areas have been determined around these alerts. These transit alert areas have been represented by the shaded circles centered at the speed camera alerts 13 and police alert 14.

As the user at GPS location 30 enters the transit alert area for speed camera alert 13, the speed camera alert 13 is considered a relevant transit alert and the user is advised of the alert. At this point, the police alert 14 is not considered a relevant transit alert.

However, as the user progresses along the road to GPS location 31, they enter the transit alert area for police alert 14 and police alert 14 is now considered a relevant transit alert, even though it is several turns away from GPS location 31. Accordingly, the user is advised of this alert.

FIGS. 1-6 have illustrated various preferred embodiments of the invention in a visual map interface. It will be appreciated that these Figures have been provided only as a demonstration for visualising the involved systems; it is not necessary for the user to provided with such an interface, nor for the system to utilise such an interface. For example, in the embodiment illustrated in FIG. 2, the user may be audibly notified of the relevant transit alerts, e.g. "upcoming speed camera (12) in 100 m", or "closed road (16) on left, after left turn in 100 m".

SEVENTH EMBODIMENT—SYSTEM FOR PROVIDING AN ALERT

The invention further relates to a system for providing the abovementioned alerts to a user. This system has been represented as installed in a helmet 100 in FIGS. 7*a* and 7*b*.

In particular, the helmet 100 includes an impact resistant shell 101, various air vents 102, and the system for providing the alert to the user in a frontal portion of the helmet 103. The impact absorbing shell is preferably made of composite fiber and the air vents 102 allow for air flow into the helmet for comfort of the user. In certain embodiments, the air vents

106 may be selectively openable depending on the amount of ventilation required. The helmet 100 also comprises an internal lining for comfort purposes.

Figures 7A, 7B:
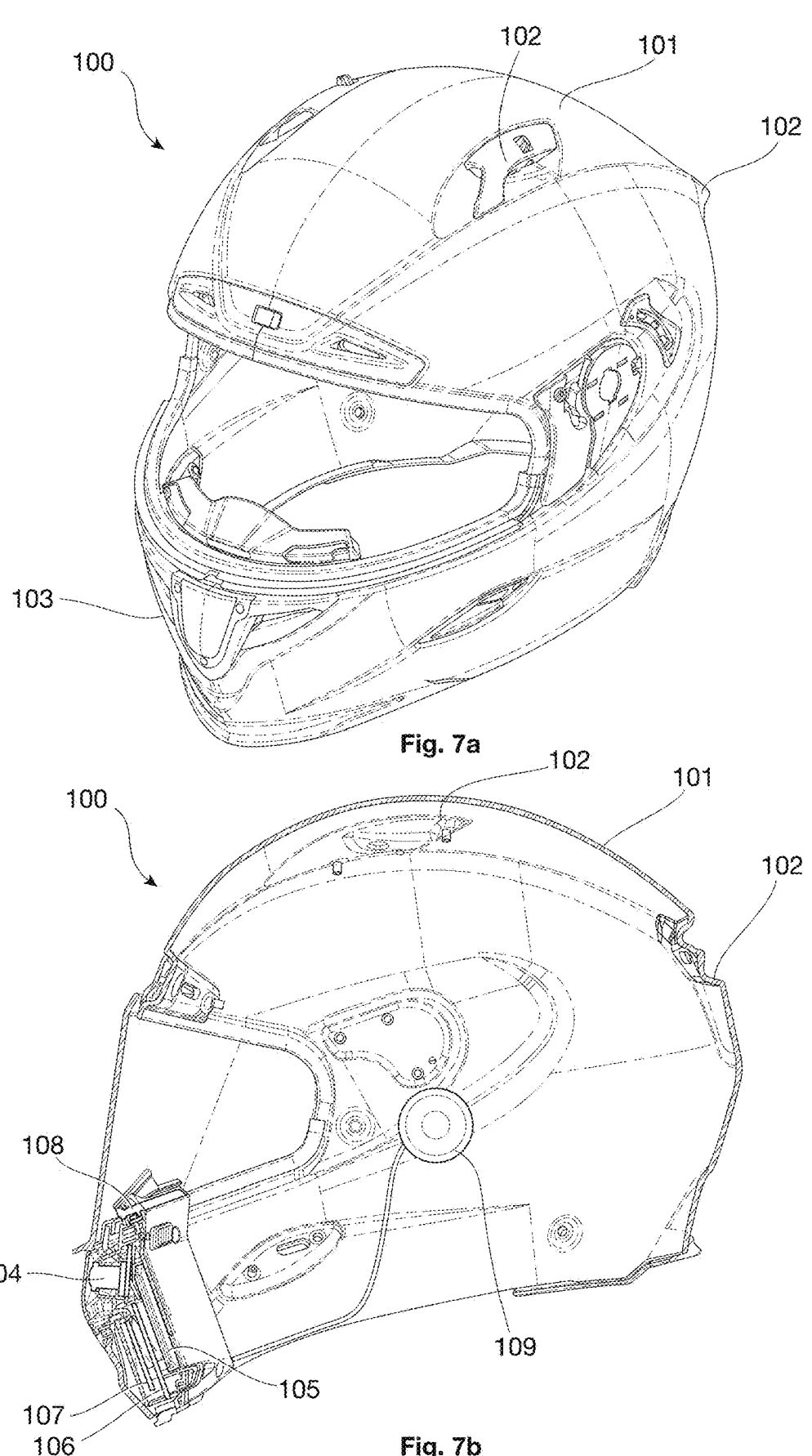

The system, shown in detail in FIG. 7*b*, includes a GPS unit 104, a memory unit 105, and a processing module 106 including a data communication unit 107. These components are located internally of the helmet 100 such as to mitigate any risk of damaging the components in use. The GPS unit 104 and data communication unit 107 are preferably located to the periphery of the helmet 100 such as to provide a clear signal for data transmission.

The data communication unit 107 may connect directly to a cellular data network or include a Bluetooth of Wi-Fi unit for connecting to a cellular data enabled device (e.g. a mobile phone of the user). The helmet 100 may also include a crash resistant battery (not shown) to power the system.

The illustrated helmet 100 includes two communication means in the array of light emitting devices 108 and the integrated speakers 109, which are configured to visually and audibly alert the user of the relevant transit alerts. The array of light emitting devices 108 may be a plurality of light-emitting diodes (LED) that preferably generate a light signal toward a peripheral vision area of the helmet, such as to provide the alert(s) while minimising any distractions to the user during transit.

This system may be used in conjunction with any of the above embodiments, such that the GPS unit 104 logs a current GPS location 11 and compares this location to a previously GPS location 10 stored in the memory unit 105. These two data points can be used to determine the transit area and transit direction of the user. The processing module 106 and data communication unit 107 may then retrieve all records of transit alerts in the transit area from an external source (e.g. a central server) and reduce these full records to the relevant transit alerts for the user by an abovementioned method. These relevant transit alerts can be presented to the user through the combination of visual alerts from the array of light emitting devices 108 and audible alerts through the integrated speakers 109.

The array of light emitting devices 108 can be configured to emit light with different colors and/or emit specific light patterns with each color and/or light pattern being associated with a different transit alert or a location of the transit alert.

In certain embodiments, the array of light emitting devices 108 may include a first set of LEDs for indicating the transit alert type and a second set of LEDs for indicating the relative location of the transit alert. For example, the first set of LEDs may alternate red and blue lights, and the second set of LEDs may blink once on a left side of the helmet 100 to indicate that there is a police alert after an upcoming left turn. Distinct colors and/or light patterns may be assigned for each alert type and optionally these may be configurable by the user.

The integrated speakers 109 may be configured to verbally narrate the relevant alerts and their locations relative to the user or, depending on the user's preferences, play predetermined sound cues to indicate the upcoming relevant alerts.

The abovementioned system has been described in relation to a helmet for providing the alerts to the user; however, it will be appreciated that the system may be provided through various other means. For example, the system could be provided in an audio-visual display installed in a vehicle dashboard, as a mobile phone application, through a wireless earpiece (providing audible alerts), or a combination of the above.

In this specification, adjectives such as left and right, top and bottom, hot and cold, first and second, and the like may be used to distinguish one element or action from another element or action without necessarily requiring or implying any actual such relationship or order. Where context permits, reference to a component, an integer or step (or the alike) is not to be construed as being limited to only one of that component, integer, or step, but rather could be one or more of that component, integer or step.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The above description relating to embodiments of the present disclosure is provided for purposes of description to one of ordinary skill in the related art. It is not intended to be exhaustive or to limit the disclosure to a single disclosed embodiment. As mentioned above, numerous alternatives and variations to the present disclosure will be apparent to those skilled in the art from the above teaching. One or more embodiments described above may be combined in a single alert generation system and/or implemented together in a smart helmet. Accordingly, while some alternative embodiments have been discussed specifically, other embodiments will be apparent or relatively easily developed by those of ordinary skill in the art. The present disclosure is intended to embrace all modifications, alternatives, and variations that have been discussed herein, and other embodiments that fall within the spirit and scope of the above description.

In a first example of an embodiment, a method for providing alerts to a user of a helmet includes determining a current location and a bearing of the user, determining a transit area and a transit direction of the user based on the current location and the bearing of the user, determining a projected transit path within the transit area based on the transit direction, retrieving records of transit alerts based on the transit area of the user, selecting relevant transit alerts from the records of transit alerts by removing the records of transit alerts that are not on the projected transit path of the user, continuously updating the projected transit path and the relevant transit alerts as the current location and the bearing of the user changes, and alerting the user, via an audible alert or a visual alert delivered by the helmet, of the relevant transit alerts.

In the first example, the projected transit path may include traffic routes from the current location in the transit direction, and wherein traffic routes from the current location may include one or more turns from the transit direction.

In the first example, the projected transit path may include traffic routes from the current location up to four turns from the transit direction.

In the first example, the projected transit path may exclude traffic routes from the current location in a 90-degree arc opposite the transit direction.

In the first example, the projected transit path may exclude traffic routes from the current location in a 180-degree arc opposite the transit direction.

In the first example, the projected transit path may exclude traffic routes from the current location in an arc opposite the transit direction, where an angle of the arc is variable depending on a transit speed of the user.

In the first example, each transit alert may be analysed for traffic routes that would lead to the transit alert, and the relevant transit alerts may be further selected from the records of transit alerts by comparing overlapping regions of the transit area of the user with the traffic routes that would lead to the transit alerts.

In the first example, the method may include sorting, by the helmet, the relevant transit alerts by a priority according to distance from the current location to each relevant transit alert of the relevant transit alerts.

In the first example, the visual alert may be configured to emit light of different colors based on different types of relevant transit alerts and different light patterns based on locations of the relevant transit alerts.

In a second example of an embodiment, a method for providing alerts to a user of a helmet includes determining a current location of the user, determining a transit speed of the user, determining a transit area of the user based on the current location and the transit speed of the user, retrieving records of transit alerts in the transit area of the user, determining relevant transit alerts from the records of transit alerts based on distances between the current location and locations associated with the records of transit alerts, wherein a number of the relevant transit alerts varies based on the transit speed of the user, and alerting the user, via an audible alert or a visual alert delivered by the helmet, of the relevant transit alerts.

In the second example, determining the relevant transit alerts may further include removing transit alerts that are not located within the transit area.

In the second example, each record of a transit alert may be analysed for a transit alert area, and wherein the relevant transit alerts may be selected from the records of transit alerts by comparing overlapping regions of the current location and the transit alert areas.

In the second example, determining the relevant transit alerts may include sorting the records of transit alerts by a priority according to distance from the current location and a number of turns from a transit direction to the locations associated with the respective records of transit alerts.

In the second example, the user may be alerted to the relevant transit alerts in order of their priority, wherein the user only be alerted to a predetermined number of relevant transit alerts having highest priority, and wherein the predetermined number of relevant transit alerts may increase as the transit speed of the user increases.

In a third example of an embodiment, helmet is configured to provide alerts to a user, the helmet includes: a navigation unit configured to provide current information of the user; a memory unit configured to store previous information from the navigation unit; a processing module configured to: determine a transit area and a transit direction of the user based on a current location of the user from the current information and previously stored location(s) of the user from the previous information; retrieve records of transit alerts in the transit area of the user; and select relevant transit alerts from the records of transit alerts by excluding the records of transit alerts outside of a circular sector having a center at the current location of the user and a radius based on a transit speed of the user; and a communication module configured to present the user the relevant transit alerts as audible and/or visual alerts.

In the third example, the processing module may include a data communication unit for retrieving the records of transit alerts from an external source.

In the third example, the communication module may include a display for visually alerting the user of the relevant transit alerts.

In the third example, the communication module may include an array of light emitting devices for visually alerting the user.

In the third example, the communication module may include a speaker for audibly alerting the user of the relevant transit alerts.

In the third example, the helmet may be configured to continuously update the relevant transit alerts and alert the user as movement is detected by the navigation unit.

What is claimed is:

1. A method for providing alerts to a user of a helmet, the method comprising:

determining a current location and a bearing of the user, determining a transit area and a transit direction of the user based on the current location and the bearing of the user, determining a projected transit path within the transit area based on the transit direction, retrieving records of transit alerts based on the transit area of the user, selecting relevant transit alerts from the records of transit alerts by removing the records of transit alerts that are not on the projected transit path of the user, continuously updating the projected transit path and the relevant transit alerts as the current location and the bearing of the user changes, and alerting the user, via an audible alert or a visual alert delivered by the helmet, of the relevant transit alerts.

2. The method according to claim 1, wherein the projected transit path includes traffic routes from the current location in the transit direction, and wherein traffic routes from the current location include one or more turns from the transit direction.

3. The method according to claim 2, wherein the projected transit path includes traffic routes from the current location up to four turns from the transit direction.

4. The method according to claim 1, wherein the projected transit path excludes traffic routes from the current location in a 90-degree arc opposite the transit direction.

5. The method according to claim 1, wherein the projected transit path excludes traffic routes from the current location in a 180-degree arc opposite the transit direction.

6. The method according to claim 1, wherein the projected transit path excludes traffic routes from the current location in an arc opposite the transit direction, where an angle of the arc is variable depending on a transit speed of the user.

7. The method according to claim 1, wherein each transit alert is analysed for traffic routes that would lead to the transit alert, and the relevant transit alerts are further selected from the records of transit alerts by comparing overlapping regions of the transit area of the user with the traffic routes that would lead to the transit alerts.

8. The method of claim 1, further comprising:

sorting, by the helmet, the relevant transit alerts by a priority according to distance from the current location to each relevant transit alert of the relevant transit alerts.

9. The method of claim 1, wherein the visual alert is configured to emit light of different colors based on different types of relevant transit alerts and different light patterns based on locations of the relevant transit alerts.

10. A method for providing alerts to a user of a helmet, the method comprising:

determining a current location of the user, determining a transit speed of the user, determining a transit area of the user based on the current location and the transit speed of the user, retrieving records of transit alerts in the transit area of the user, determining relevant transit alerts from the records of transit alerts based on distances between the current location and locations associated with the records of transit alerts, wherein a number of the relevant transit alerts varies based on the transit speed of the user, and alerting the user, via an audible alert or a visual alert delivered by the helmet, of the relevant transit alerts.

11. The method according to claim 10, wherein determining the relevant transit alerts further comprises removing transit alerts that are not located within the transit area.

12. The method according to claim 10, wherein each record of a transit alert is analysed for a transit alert area, and wherein the relevant transit alerts are selected from the records of transit alerts by comparing overlapping regions of the current location and the transit alert areas.

13. The method according to claim 10, wherein determining the relevant transit alerts includes sorting the records of transit alerts by a priority according to distance from the current location and a number of turns from a transit direction to the locations associated with the respective records of transit alerts.

14. The method according to claim 13, wherein the user is alerted to the relevant transit alerts in order of their priority, wherein the user is only alerted to a predetermined number of relevant transit alerts having highest priority, and wherein the predetermined number of relevant transit alerts increases as the transit speed of the user increases.

15. A helmet configured to provide alerts to a user, the helmet comprising:

a navigation unit configured to provide current information of the user;

a memory unit configured to store previous information from the navigation unit;

a processing module configured to:

determine a transit area and a transit direction of the user based on a current location of the user from the current information and previously stored location(s) of the user from the previous information;

retrieve records of transit alerts in the transit area of the user; and select relevant transit alerts from the records of transit alerts by excluding the records of transit alerts outside of a circular sector having a center at the current location of the user and a radius based on a transit speed of the user; and a communication module configured to present the user the relevant transit alerts as audible alerts and/or visual alerts.

16. The helmet according to claim 15, wherein the processing module includes a data communication unit for retrieving the records of transit alerts from an external source.

17. The helmet according to claim 15, wherein the communication module includes a display for visually alerting the user of the relevant transit alerts.

18. The helmet according to claim 15, wherein the communication module includes an array of light emitting devices for visually alerting the user.

19. The helmet according to claim 15, wherein the communication module includes a speaker for audibly alerting the user of the relevant transit alerts.

20. The helmet according to claim 18, wherein the helmet is configured to continuously update the relevant transit alerts and alert the user as movement is detected by the navigation unit.

* * * * *